(12) United States Patent
Vijayan et al.

(10) Patent No.: US 7,965,782 B1
(45) Date of Patent: Jun. 21, 2011

(54) REDUCED COMPLEXITY MAXIMUM LIKELIHOOD DECODER FOR MIMO COMMUNICATIONS

(75) Inventors: Logeshwaran Vijayan, Chennai (IN); Partha Sarathy Murali, Hyderabad (IN); Sundaram Vanka, Notredame, IN (US)

(73) Assignee: Redpine Signals, Inc., San Jose, CA (US)

( * ) Notice: Subject to any disclaimer, the term of this patent is extended or adjusted under 35 U.S.C. 154(b) by 911 days.

(21) Appl. No.: 11/801,786

(22) Filed: May 11, 2007

(51) Int. Cl.
*H04L 5/12* (2006.01)
(52) U.S. Cl. .................. 375/262; 375/260; 375/259
(58) Field of Classification Search .................. 375/262, 375/260, 259
See application file for complete search history.

(56) References Cited

U.S. PATENT DOCUMENTS

| | | | |
|---|---|---|---|
| 5,566,191 | A | 10/1996 | Ohnishi et al. |
| 6,122,763 | A | 9/2000 | Pyndiah et al. |
| 6,302,576 | B1 | 10/2001 | Ono et al. |
| 6,801,580 | B2 | 10/2004 | Kadous |
| 7,035,672 | B2 | 4/2006 | Nakaya |
| 7,039,846 | B2 | 5/2006 | Hewitt et al. |
| 7,054,378 | B2 | 5/2006 | Walton et al. |
| 7,116,734 | B1 | 10/2006 | Nergis |
| 7,120,199 | B2 | 10/2006 | Thielecke et al. |
| 2004/0091058 | A1 | 5/2004 | Tosato et al. |
| 2006/0276918 | A1* | 12/2006 | Cioffi et al. ................ 700/94 |
| 2007/0211786 | A1* | 9/2007 | Shattil ............................ 375/141 |
| 2008/0279298 | A1* | 11/2008 | Ben-Yishai et al. .......... 375/261 |
| 2008/0279299 | A1* | 11/2008 | Reuven et al. ................ 375/267 |

OTHER PUBLICATIONS

"The chase Family of Detection Algorithms for multiple-Input, Multiple Output Channels", Waters & Berry, Globecom 2004, IEEE 2004.
"V-Blast: An Architecture for Realizing Very High Data Rates over the Rich-Scattering Wireless Channel", Wolniausky, Foschini, Golden, Valenzuela, Bell Laboratories, IEEE 1998.
"Simplified Soft-Output Demapper for Binary Interleaved COFDM with Application to HIPERLAN/Z", Tosato & Bisaglia, 2001 Hewlett-Packward.

* cited by examiner

*Primary Examiner* — Shuwang Liu
*Assistant Examiner* — Michael R Neff
(74) *Attorney, Agent, or Firm* — File-EE-Patents.com; Jay A. Chesavage

(57) ABSTRACT

A reduced complexity maximum likelihood decoder receives a stream of symbols Y and channel estimate H. A transformation converts Y and H into Z and R by computing matrix R, such that the product of R and Q produces matrix H. A second transformation column-swaps matrix H to form H', thereafter generating Q' and R' subject to the same constraints as was described for Q and R. Transformed variables Z and Z' are formed by multiplying Y by $Q^H$ and $Q'^H$, respectively. Table entries with Z and R and Z' and R' have entries of all possible x2 accompanied by estimates of x1 derived from x2 and Z, and similar entries of all possible x1 accompanied by estimates of x2 derived from x1 and Z'. Hard and soft decisions are made by finding the minimum distance metric of the combined entries of the first and second table.

29 Claims, 19 Drawing Sheets

Figure 1
MIMO 2x2 Transmitter/Receiver Link
Prior Art

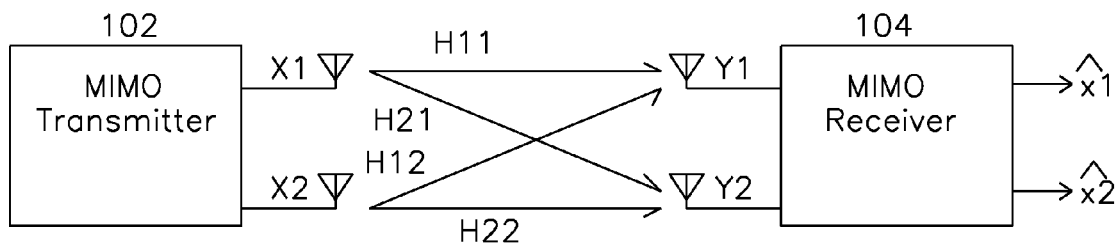

Figure 2
Prior Art $$Y = H * X + N$$

$$\begin{bmatrix} Y_1 \\ Y_2 \end{bmatrix} = \begin{bmatrix} H_{11} & H_{12} \\ H_{21} & H_{22} \end{bmatrix} * \begin{bmatrix} X_1 \\ X_2 \end{bmatrix} + \begin{bmatrix} N_1 \\ N_2 \end{bmatrix}$$

Figure 3
MIMO 3x3 Transmitter/Receiver Link
Prior Art

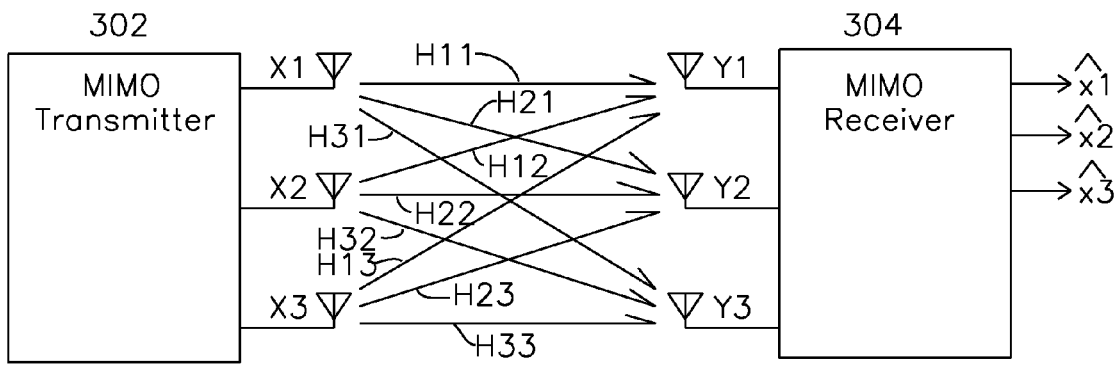

Figure 4
Prior Art $$\begin{bmatrix} Y_1 \\ Y_2 \\ Y_3 \end{bmatrix} = \begin{bmatrix} H_{11} & H_{12} & H_{13} \\ H_{21} & H_{22} & H_{23} \\ H_{31} & H_{32} & H_{33} \end{bmatrix} * \begin{bmatrix} X_1 \\ X_2 \\ X_3 \end{bmatrix} + \begin{bmatrix} N_1 \\ N_2 \\ N_3 \end{bmatrix}$$

Figure 5
deriving $\hat{x}_1$ from $\hat{x}_2$
prior art $$Y = H*X + N \quad \text{(Eq 5.1)}$$

$$Y = [Q*R]*X + N \quad \text{(Eq 5.2)}$$

$$Q^H Y = [Q^H*Q*R]*X + Q^H*N \quad \text{(Eq 5.3)}$$

$$Q^H Y = R*X + Q^H*N \quad \text{(Eq 5.4)}$$

$$Z = Q^H Y \quad \text{(Eq 5.5)}$$

$$Z = R*X + Q^H*N \quad \text{(Eq 5.6)} \quad \text{(noise term)}$$

$$\begin{bmatrix} z_1 \\ z_2 \end{bmatrix} = \begin{bmatrix} r_{11} & r_{12} \\ 0 & r_{22} \end{bmatrix} * \begin{bmatrix} x_1 \\ x_2 \end{bmatrix} + \begin{bmatrix} Q^H N_1 \\ Q^H N_2 \end{bmatrix} \quad \text{(Eq 5.7)}$$

$$z_1 = r_{11}*x_1 + r_{12}*x_2 + N1 \quad \Rightarrow \text{ hard values for x1 decision} \quad \text{(Eq 5.8)}$$

$$z_2 = r_{22}*x_2 + N2 \quad \text{(Eq 5.9)} \Rightarrow \text{ hard values for x2 decision}$$

$$z'_1 = r'_{11}*x_2 + r'_{12}*x_1 + N1 \quad \text{(Eq 5.10)}$$

$$z'_2 = r'_{22}*x_1 + n2 \quad \text{(Eq 5.11)}$$

Figure 6
prior art

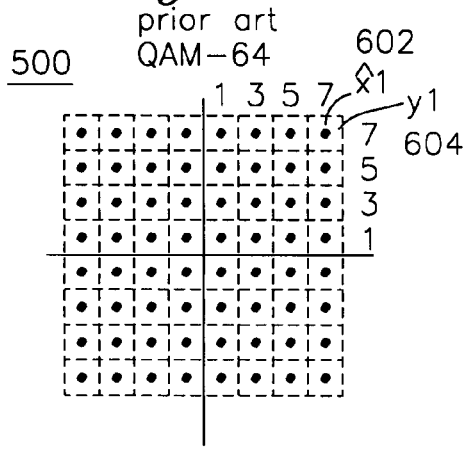

Figure 7
prior art
1 channel ML Decoder Operation (k=64)

702: Receive complex signal y

704: generate list of distances to each of k=64 possible complex constellation symbols $\hat{x}$ 706: Hard Decision = select minimum distance constellation symbol 708: Generate soft decision:
For each b (of 6 hard decision bits):
  $m_0$ = min dist for bit b
  $m_1$ = min dist for complement of bit b
  soft decision for bit b =
  $|m_0^2 - m_1^2|$ * sgn(hard decision)

Figure 8
prior art 1 channel ML decoder (k=64 for QAM-64)

$H\hat{x}$ = estimated rx value
y = received value

| 802 Poss QAM value | dist 804 $\sqrt{|H\hat{x}-y|^2}$ | |
|---|---|---|
| 000000 | $r_0 = 30$ | |
| 000001 | $r_1 = 40$ | |
| 000010 | $r_2 = 20$ | 806 Hard Decision |
| 000011 | $r_3 = 3$ | min dist $m_0$ |
| 000100 | $r_4 = 15$ | |
| ... | ... | |
| 110000 | $r_{16} = 40$ | |
| 110001 | $r_{17} = 45$ | |
| 110010 | $r_{18} = 32$ | min dist $m_1$ (1 of 6) |
| 110011 | $r_{19} = 22$ | |
| 110100 | $r_{20} = 37$ | |
| ... | ... | |
| 111111 | $r_{63} = 27$ | |

810, 808

ML decoder for QAM-64 1-channel (H matrix processing)

Soft Demapper for QAM-64 1-channel using a QR transformation

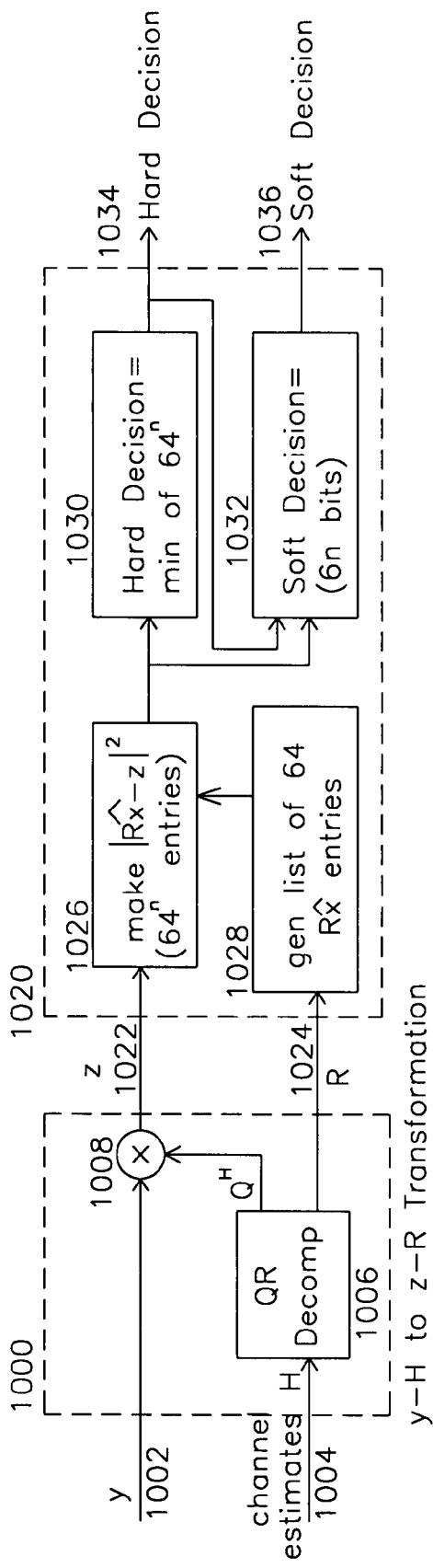

2 channel OSIC Symbol-Chase demodulator
Prior Art 2 channel MIMO demodulator 2 channel MIMO demodulator n channel MIMO demodulator n channel MIMO demodulator

Figure 14
figure 5 generalized to n streams of data $$Z = Q^H Y \quad (Eq\ 5.5)$$

$$Z = R*X + \underbrace{Q^H*N}_{\text{(noise term)}} \quad (Eq\ 5.6)$$

$$\begin{bmatrix} Z_1 \\ Z_2 \\ \vdots \\ Z_n \end{bmatrix} = \begin{bmatrix} R_{11} & \cdots & R_{1n} \\ 0 & R_{22} & R_{2n} \\ \vdots & & \vdots \\ 0 & 0 & 0 & R_{nn} \end{bmatrix} * \begin{bmatrix} X_1 \\ X_2 \\ \vdots \\ X_n \end{bmatrix} \quad (Eq\ 14.1)$$

(upper triangular matrix)

$Z_n = R_{nn} * X_n$ (eq 14.2) given Zn & Rnn solve Xn $Z_{n-1} = R_{n-1,n} * X_{n-1} + R_{nn} * X_n$
(eq 14.3) given Rnn, Xn, $Z_{n-1}$, $R_{n-1,n}$ solve for Xn−1

3 channel MIMO demodulator 3 channel MIMO demodulator 3 channel MIMO demodulator

Figure 17A
2 channel MRC demodulator $$y_1 = \overbrace{h_{11} * x_1 + h_{12}* x_2}^{y_{c1}} \quad \text{(Eqn 1)} \quad \xrightarrow{\text{form } y_{c1} \text{ for all possible } x2} \quad y_{c1} = y_1 - h_{12}* x_2 \quad \text{(Eqn 2)}$$

$$\hat{x}_1 = \text{conj}(h_{11}) * y_{c1} \quad \text{(Eqn 3)}$$

$$y_2 = \underbrace{h_{21} * x_1 + h_{22}* x_2}_{y_{c2}} \quad \text{(Eqn 4)} \quad \xrightarrow{\text{form } y_{c2} \text{ for all possible } x2} \quad y_{c2} = y_2 - h_{22}* x_2 \quad \text{(Eqn 5)}$$

$$\hat{x}_2 = \text{conj}(h_{21}) * y_{c2} \quad \text{(Eqn 6)}$$

Perform MRC for estimated $\{x1, x2\}$ for each possible x2:

Figure 17B
2 channel MRC demodulator

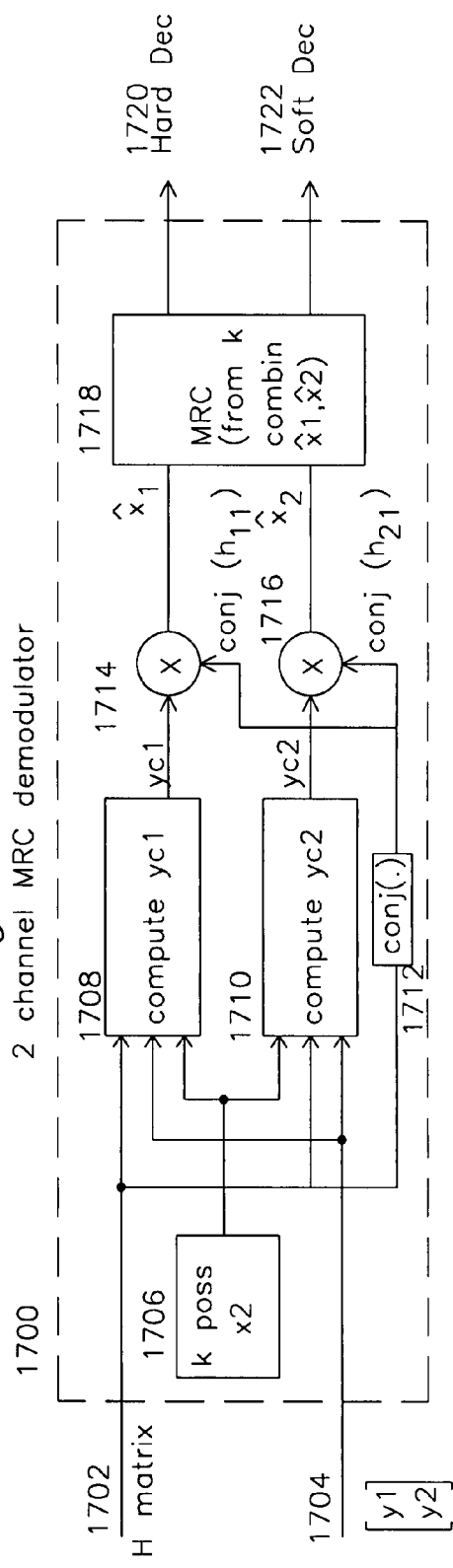

2 channel MRC demodulator

REDUCED COMPLEXITY MAXIMUM LIKELIHOOD DECODER FOR MIMO COMMUNICATIONS

FIELD OF THE INVENTION

The present application relates to a decoder for wireless signal processing. More specifically, it relates to a reduced complexity maximum likelihood decoder for concurrently decoding n streams of multiple input multiple output (MIMO) symbol data.

BACKGROUND OF THE INVENTION

FIG. 1 shows a multiple-input multiple-output (MIMO) wireless transmitter/receiver 100 for n=2 streams. MIMO transmitter 102 includes two antennas which transmit original data x1 and x2, where the antennas are typically separated by a short distance, which may be a quarter of a wavelength for the carrier frequency, or any convenient separation distance. For each separate transmit symbol stream X1, X2 the value received at receiver 104 inputs Y1 and Y2 represents the superposition of these X1 and X2 symbols according to the communications channel between each transmit antenna and receive antenna. The object of receiver 104 is to recover estimates x1 and x2 of the originally transmitted data streams x1 and x2. For a 2×2 (2 input, 2 output) transmitter/receiver pair, the channels for input y1 are H11 and H12, and the channels for input y2 are H12 and H22.

FIG. 2 shows the matrix equations of operation for the receiver of FIG. 1, where H is known as the channel estimate matrix, and is populated with channel characteristic values determined during preamble time.

FIG. 3 shows a 3×3 MIMO transmitter/receiver link, where transmitter 302 includes three transmit antennas and receiver 204 includes three receive antennas. The respective communications channels for input y1, y2, and y3 are {h11, h12, h13}, {h21, h22, h23}, and {h31, h32, h33}. Each transmit symbol stream X1, X2, X3 typically carries a unique stream of data, and the objective of the MIMO receiver 304 is to segregate and recover each stream of data in the form of a hard decision representing the most likely transmitted value, and a soft decision representing the certainty of each bit of the hard decision. FIG. 4 shows the matrix equations for the transmitter and receiver of FIG. 3. As before, Y is the transmitted value, H is the channel estimate matrix, X is the received value, and N is the channel noise.

FIG. 5 shows a transformation which is useful for separating superpositioned streams of symbol data containing x1 and x2 into their separated constituent values. Equation 5.1 is the previously described receiver equation, and equation 5.2 introduces the QR transformation, where the matrix R is in the form of an upper triangular matrix. This results in the matrix form of equation 5.7, which produces equation 5.9 which is reduced to one x2 variable, and equation 5.8 which has both x1 and x2 variables. By transforming all of the possible Y values into Z values through multiplication by $Q^H$ (Hermitian of the Q matrix), it is possible to directly solve equation 5.9 for the x2 value using a metric such as minimum distance from z2. This can be done in by computing a distance metric to z2, where z2 is calculated by multiplying received Y by $Q^H$, and subtracting each of the 64 possible QAM-64 x2 symbol r22*x2, for the case where the number of possible symbols k is 64. The symbol with the minimum metric is the most likely transmitted symbol. It is then possible to substitute this value x2 into equation 5.8 with z1 to solve for x1. The noise terms of equation 5.7 are ignored, as they represent non-deterministic values forming the expanded square regions 604 around possible symbol points 602 of FIG. 6, as will be described.

FIG. 6 shows the constellation diagram in I and Q space for QAM-64, whereby 64 different symbols may be transmitted using the I and Q data values by using variations in amplitude and phase to place the transmitted signal into one of the constellation points. Point 602 represents an estimated transmit value x1, and region y1 604 represents a region of points which would be resolved to the most likely estimated transmit value x1.

FIG. 7 shows the operation of a single channel maximum likelihood (ML) decision decoder operating in the QAM-64 constellation of FIG. 6. In a first step 702, a complex signal y is received. From the channel estimation value h, each of the 64 possible constellation symbols x1 through x64 is multiplied by h and the distance from the received symbol y to each of the 64 possible h*x values is computed. The hard decision of the decoder is the estimated x associated with the minimum distance metric $m_0$, shown in step 706. In step 708, the soft decision is made, whereby for each of the 6 bits of the hard decision, the minimum metric $m_1$ (among 64 values) for the complement of the bit of the hard decision is found. The soft decision value for each bit is then calculated from $|m_0^2 - m_1^2|$*sgn(hard decision) in conjunction with a prior art technique such as the Max-Log-MAP approximation.

FIG. 8 illustrates an example of the operation of a maximum likelihood receiver according to the flowchart of FIG. 7. An incoming symbol y is received, and a distance metric 804 from the received symbol to all 64 possible symbols is computed. The minimum distance metric value shown as 3 is associated with hard decision 806, corresponding to step 706 of FIG. 7. The soft decision computation for the hard decision bit of column 810 is done by finding the minimum distance metric for the complement (1 in this example), where the hard decision bit is 0. For all decisions with the complement of the corresponding decision bit (column 1, value 1 in this example), the minimum metric $m_1$ is 22, and the soft decision value is calculated from $(|3^2 - 22^2|)*(-1)$, where sgn(1)=1, and sgn(0)=−1. The soft decision value is computed in this manner, resulting in a soft decision comprising 6 values, one value for each of the hard decision bits.

FIGS. 9A and 9B illustrate examples of relatively simple decoders for single channel applications, and FIG. 10 shows the dramatic increase in complexity when performing maximum likelihood decision decoding on multiple channels of MIMO channels. In FIG. 9A, the input symbol y 902 comprising I and Q values is accompanied by a channel estimate H 914. The channel estimate 914 is used to generate a list of 64 possible table entries 916, and the distance of the received symbol y is computed 904 for each of the 64 values. Hard decision decoder 906 selects the minimum distance from the 64 calculated distances, and the soft decision calculation 908 is done for each bit of the hard decision, as was described earlier. FIG. 9B shows a single channel ML decoder with a variable transformation 950, and LLR (Log Likelihood Ratio) 978 soft decision 982 according to the method of Tosato described in U.S. Patent Application 2004/0091058. The incoming symbol y 952 accompanied by channel estimate 954 is applied to a QR decomposition function 956, which produces an R value or matrix 962, which is used to form a hard decision 976 and a soft decision using LLR metrics 978.

When a ML decoder is operating on n streams as shown in FIG. 10, the decoder 1020 complexity dramatically increases. In FIG. 10, the transformation shown in FIG. 5 is made by transformation 1000, whereby each y symbol 1002 is multiplied by the hermitian of Q to form symbol z 1022, and matrix R 1024 is used to generate a list of 64 possible estimated symbols 1028 in z symbol space. A distance metric is calculated to form a table, as before, but the size of the table 1026 is $64^n$ entries, and the hard decision 1030 selects from among these $64^n$ entries. The soft decision calculation 1032 calculates soft values for each of the 6n bits of hard decision data as described earlier. Because of the dramatic increase in decision decoder complexity associated with forming and evaluating n-tuples of hard and soft metrics for each of the possible QAM decision values for the n streams, a variety of architectures have been developed to reduce the complexity of finding hard and soft metrics for MIMO system decoders. One such system, described in U.S. Pat. No. 6,801,580, describes an Ordered Successive Interference Cancellation (OSIC) decoder, whereby the strongest symbol stream is selected and decoded first. The interference effect of this stream is cancelled from the second stream and the second stream is decoded and this process continues. A similar system is OSIC symbol-Chase, which uses the property shown in FIG. 5 whereby a transformation in variables results in received symbols y1 and y2 being converted to z1 and z2. Symbol stream x2 is derived from z2 alone and x1 is estimated from z1 and x2 combined.

A two channel OSIC symbol-chase demodulator is shown in FIG. 11. Transformation block 1100 orders the H matrix by moving the column with the largest norm to the right column to form H', after which the QR matrix decomposition generates R and QH, which is used to convert receive vector Y 1104 into Z space by multiplication by $Q^H$, as was described earlier. The decoder 1128 receives R and Z1 from transformation block 1100, and R and Z1 are used to estimate x1 using z1 and all possible values of x2 from list 1116. These values are placed in a table 1118 accompanied by a distance metric, and the table entry with the minimum distance metric is selected, thereby generating estimates of x1 and x2 as the hard decision. The soft decision 1126 computes the LLR (Log Likelihood Ratio) metrics for each bit of x1 and x2 is calculated using $|m_0^2 - m_1^2|*\text{sgn}(\text{hard decision})$. LLR metric computations are described in R. Pyndiah et al "Near Optimum Decoding of Product Codes", IEEE Globecom 94, pg 339-43, November-December 1994.

Because of the transformation into Z space of 1100, the computation of soft decision metrics may be complicated by a problem where a particular hard decision bit does not have an entry with a complementary bit available for use by the LLR metrics. When this occurs, the use of either a default soft value or some other techniques like ZF soft-values may be used.

OBJECTS OF THE INVENTION

A first object of the invention is a detector for two streams of incoming MIMO symbol data, whereby one path 1224/1225 generates a list of distance metrics and a parallel path 1226/1227 generates another list of distance metrics and a hard decision is made by selecting the minimum metric for the combined first and second distance metrics.

A second object of the invention is the generation of a first and second stream of transformed data from a stream of input data and a channel characterization matrix H, where:

the first transformed data stream comprising a first R matrix along with a hermitian of a first Q matrix computed from the incoming H matrix, the first R matrix accompanied by a first Z stream of data generated by multiplying the stream of input data by the hermitian of the first Q matrix;

the second transformed data stream comprising a second R matrix (R') along with a hermitian of a second Q matrix ($Q'^H$) computed from the incoming H matrix with the columns reversed, the second R matrix (R') accompanied by a second Z stream of data (Z' comprising z1' and z2') generated by multiplying the stream of input data by the hermitian of the second Q matrix ($Q'^H$);

where the first and second Q matrix and first and second R matrix have the property that H=Q*R, respectively, and the R matrix is upper triangular.

A third object of the invention is a two channel demodulator for a first and second stream of data, each stream comprising a Z stream of data accompanied by an R matrix where:

a first metric calculator generates a first table containing entries, each entry comprising one of the possible x2 values, an estimate of x1 computed from z1 of the first Z stream of data and the associated x2 value, and an associated distance metric, where the distance metric represents the distance from an estimated x1 and x2 to a possible x1 and x2;

a second metric calculator generates a second table containing entries, each entry comprising one of the possible x1 values, an estimate of x2 computed from z2 of the second Z stream of data (where the second Z stream Z' comprises z1',z2') and the associated x1, and an associated distance metric where the distance metric represents the distance from an estimated x1 and x2 to a possible x1 and x2;

a minimum distance metric selector which selects the minimum metric from the first table and the second table, thereby forming a hard decision for x1 and x2;

an LLR metric computation for each hard decision bit.

A fourth object of the invention is a reduced complexity maximum likelihood decoder having:

a transformation function for the generation of a first and second stream of transformed symbols from a stream of input symbols and a channel characterization matrix H, where:

the first transformed symbol stream comprising a first R matrix along with a hermitian of a first Q matrix computed from the incoming H matrix, the first R matrix accompanied by a first Z stream of symbols generated by multiplying the stream of input symbols by the hermitian of the first Q matrix;

the second transformed symbol stream comprising a second R matrix (R') along with a hermitian of a second Q matrix ($Q'^H$) computed from the incoming H matrix with the columns reversed, the second R matrix (R') accompanied by a second Z stream of symbols (the second Z stream also referred to as Z' and comprising z1',z2') generated by multiplying the stream of input symbols by the hermitian of the second Q matrix (Q');

where the first and second Q matrix and first and second R matrix have property that H=Q*R, respectively, and the R matrix is triangular;

a two channel demodulator for the first and second stream of symbols generated by the transformation function, the demodulator having:

a first metric calculator generating a first table containing entries, each entry comprising one of the possible x2 values, an estimate of x1 computed from z1 of the first Z stream of symbols and the associated x2 value, and an associated distance metric;

a second metric calculator generating a second table containing entries, each entry comprising one of the possible x1 values, an estimate of x2 computed from z2 of the second Z stream of symbols and the associated x1, and an associated distance metric;

a minimum distance metric selector which selects the minimum metric from the first table and the second table, thereby forming a hard decision for x1 and x2;

an LLR metric computation for each hard decision bit.

SUMMARY OF THE INVENTION

A reduced complexity maximum likelihood decoder for n=2 or n=3 channels of concurrent MIMO symbols, where a symbol set has k possible symbols, where k may be any of 2 (such as BPSK), 4 (such as QPSK), 16 (such as 16-QAM), or 64 (such as 64-QAM), has a transformation function which generates a first Q and R matrix from a channel characterization matrix and a second Q' and R' matrix from the column-swapped channel characterization matrix H'. A Z matrix is formed by multiplying an incoming Y symbol by a $Q^H$ (hermitian of the Q matrix), and a Z' matrix is formed by multiplying the same incoming Y symbol by $Q'^H$, a hermitian of the Q' matrix formed from column swapped H'. A first metric table 1246 having 64 entries is formed by estimating x1 from z1 and all possible x2 values. A second metric table 1252 having 64 entries is formed by estimating x2 from z1' and all possible x1 values, also shown in the equations 5.10 and 5.11 of FIG. 5. A most likely hard decision 1254 for x1 and x2 is made from the minimum metric from all entries in the first table and second table. A soft decision 1260 is made for each bit of the hard decision using an LLR metric computation. The LLR metric computation uses a k*n table size, where k is typically one of 256, 64, 16, 4, or 2, and n=2 or 3. The computation is done such that for each bit, the entry with best metric but with the particular bit inverted (0 to 1 or 1 to 0) is selected, and the LLR is computed as $|m_0^2 - m_1^2|$. One of the advantages of this approach is that it is assured that each bit has a competitor since the k*n size table is created by concatenating n tables of size k each. Each entry bit has a competitor because each of the n tables ensures that all bits of one particular spatial stream are inverted in all possible ways.

In another embodiment of the decoder operable on an arbitrary number n of concurrently transmitted symbols includes a transformation part and a decoding part. In the transformation part, a stream of n channels of input symbols is transformed into n streams of transformed symbols, each transformed stream having a transformation function including an H matrix decomposition into a Q and an upper triangular R matrix, constrained such that the product of Q*R is H, each transformed stream formed by multiplication of the input symbol stream by $Q^H$ and accompanied by R. The decoding part operates separately for each transformed symbol stream, forming a table having a number of entries equal to k, the number of unique symbols, and the entries of the table include all possible symbols for a particular value of xm, and estimates of x1 through xn (excluding xm which was selected), where the estimates of x1 through xn are computed from xm in combination with R and the previously computed values of x1 through xn (excluding xm). Each table entry then contains xm, the estimated values of x1 through xn (excluding xm), and a distance metric value to a possible (x1 . . . xn). A minimum metric selector which operates over all n tables selects the entry with the minimum metric distance and presents the associated values (x1 . . . xn) as the hard decision. A soft decision is made using the hard decision and LLR metrics associated with the distance metrics for each hard decision bit.

BRIEF DESCRIPTION OF THE DRAWINGS

FIG. 1 shows a block diagram for a 2×2 MIMO transmitter and receiver.

FIG. 2 shows the linear algebra equations of operation for a 2×2 MIMO system.

FIG. 3 shows a block diagram for a 3×3 MIMO transmitter and receiver.

FIG. 4 shows the linear algebra equations the transmitter/receiver of FIG. 3.

FIG. 5 shows the equations for detection of x1 and x2 using a QR transformation.

FIG. 6 shows a QAM-64 constellation diagram.

FIG. 7 shows the flowchart for a prior art ML decoder.

FIG. 8 shows entries from an ML decoder table.

FIG. 10 shows the block diagram for a prior art QAM-64 ML decoder having n channels of incoming data.

FIG. 14 shows the equations of operation generalized to n channels.

FIG. 17A shows the equations of operation for an MRC detector.

FIGS. 17B and 17C show the block diagram for a 2×2 MIMO detector.

DETAILED DESCRIPTION OF THE INVENTION

Figure 9A:
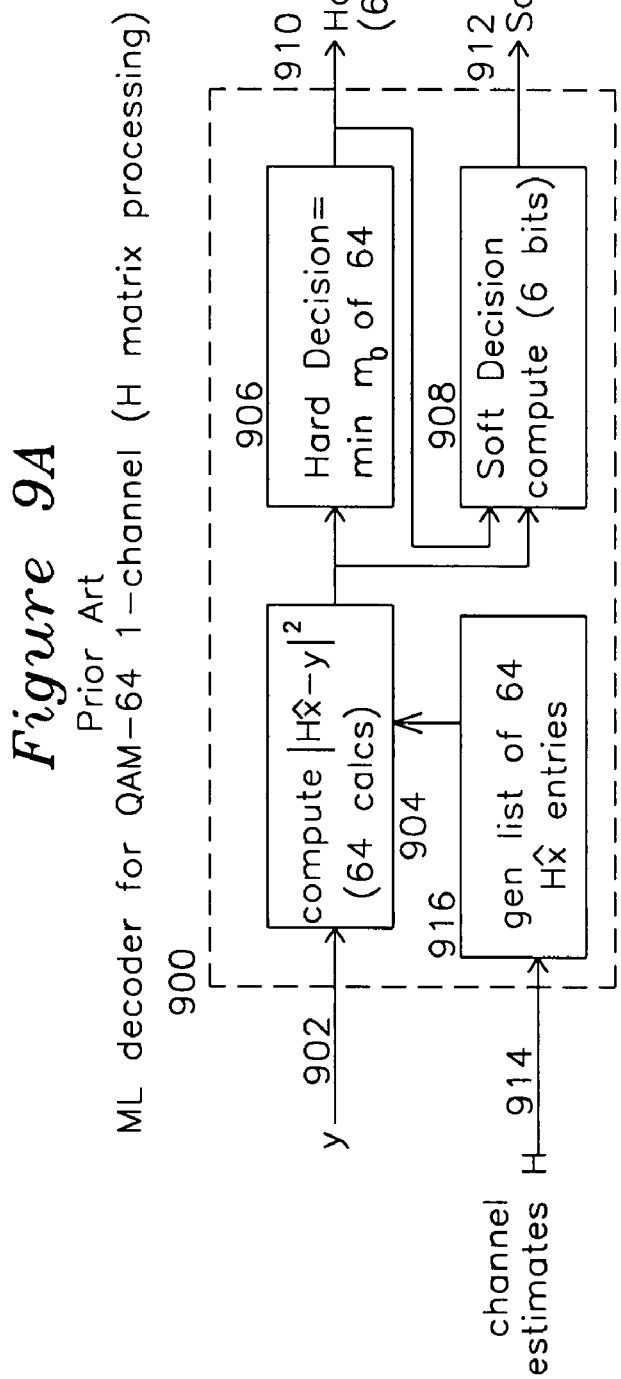
FIG. 9A shows the block diagram for a 64-QAM single channel decoder system.
Figure 9B:
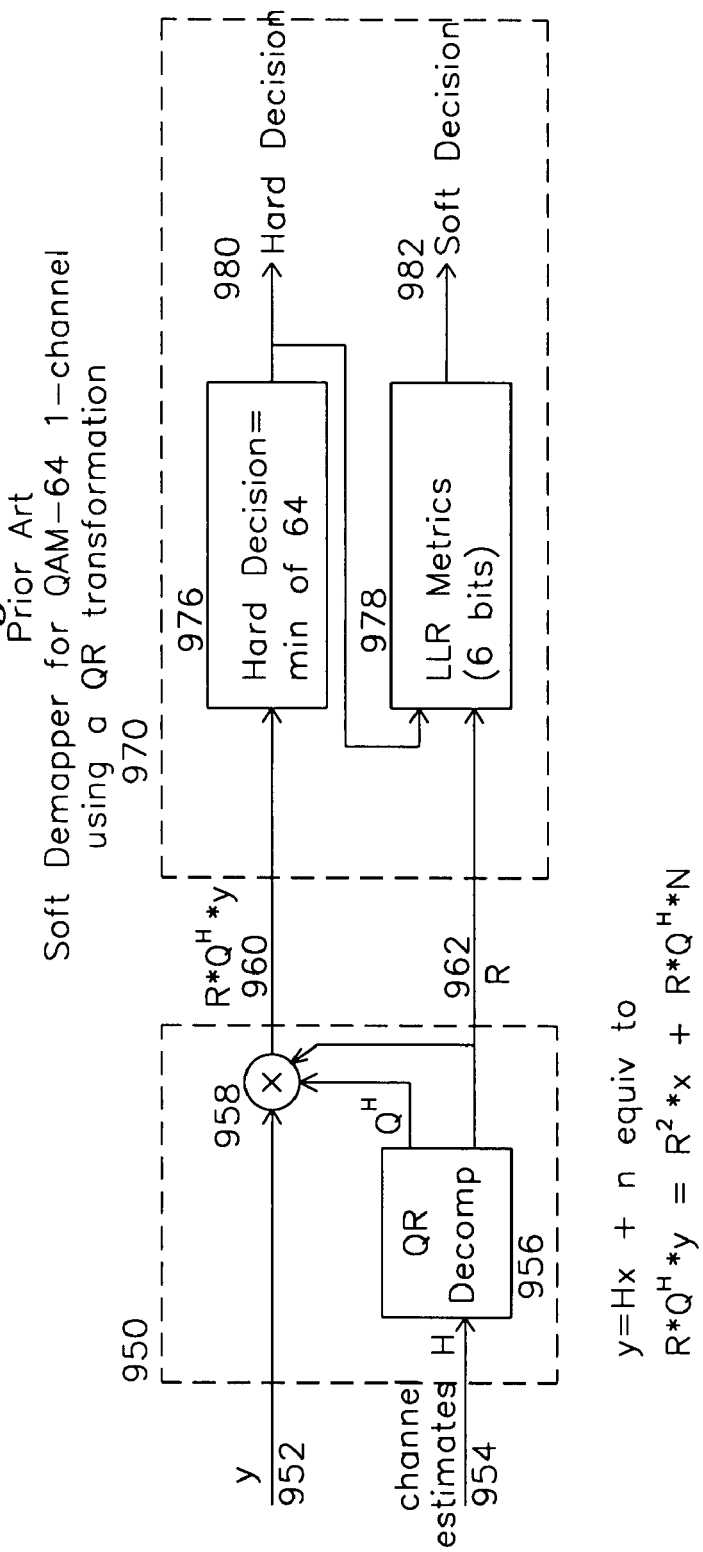
FIG. 9B shows the block diagram for a 64-QAM single channel decoder.
Figure 11:
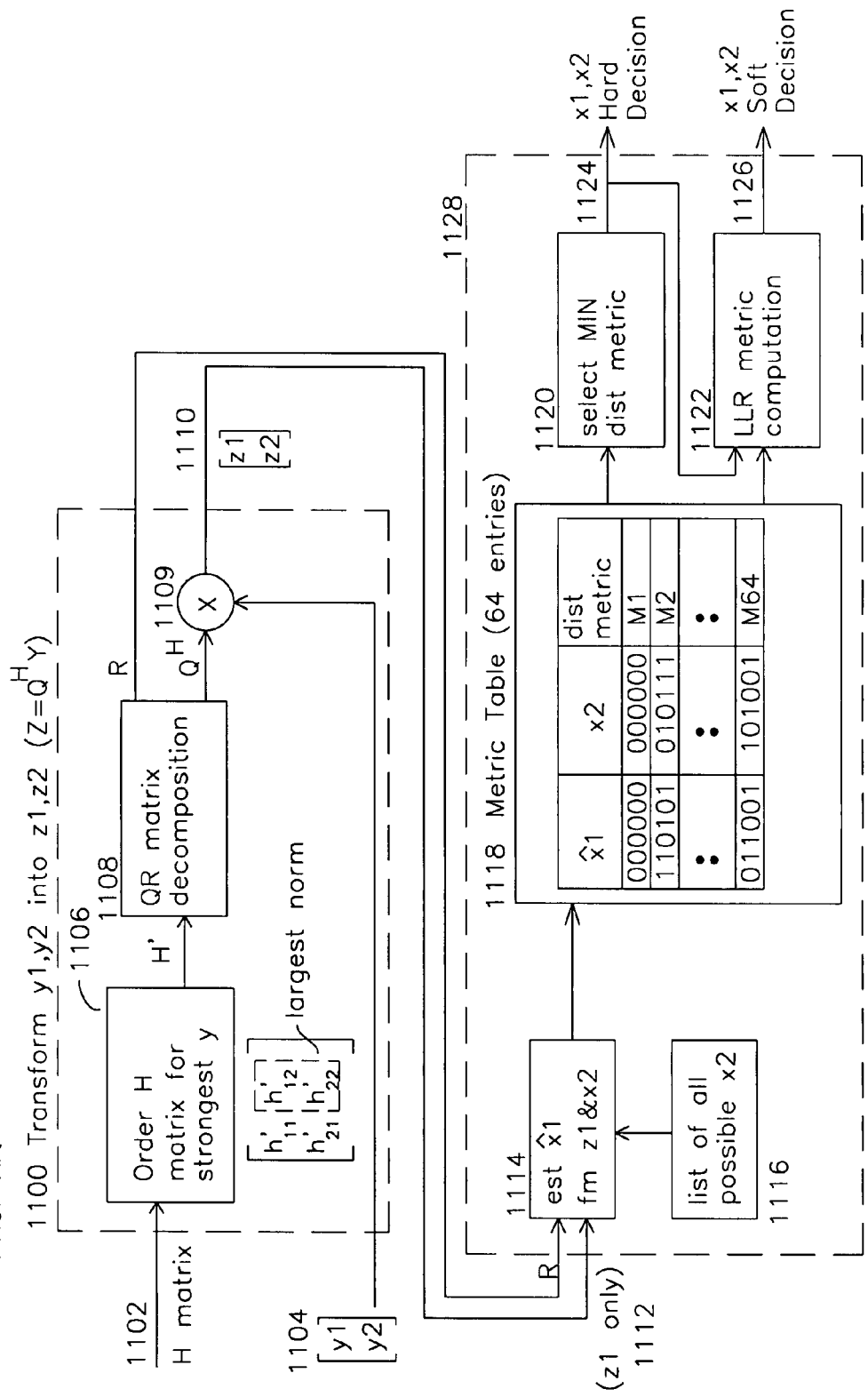
FIG. 11 shows a block diagram for a 2 channel OSIC Symbol-chase decoder.
Figure 12A:
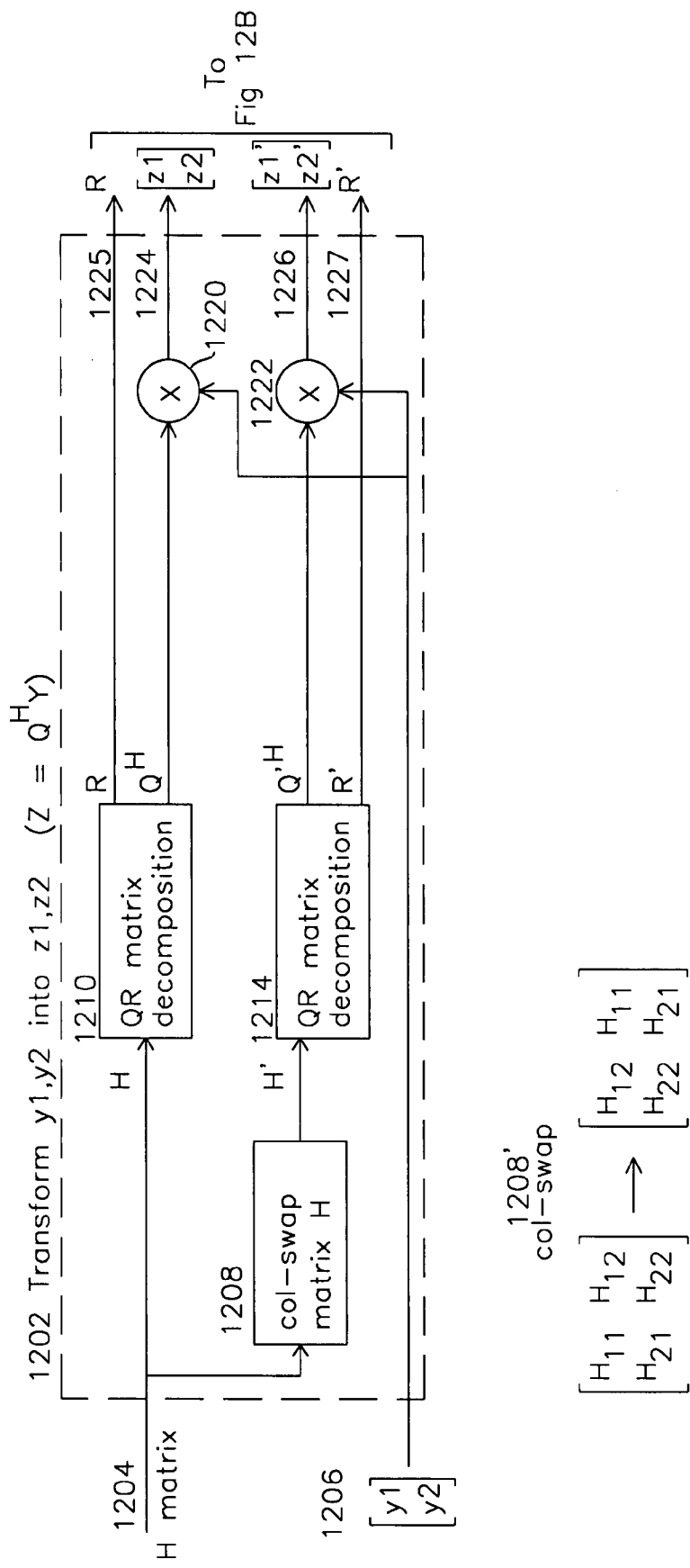
FIG. 12A shows the transformation of y,H into R,z and R',z' variables.
Figure 12B:
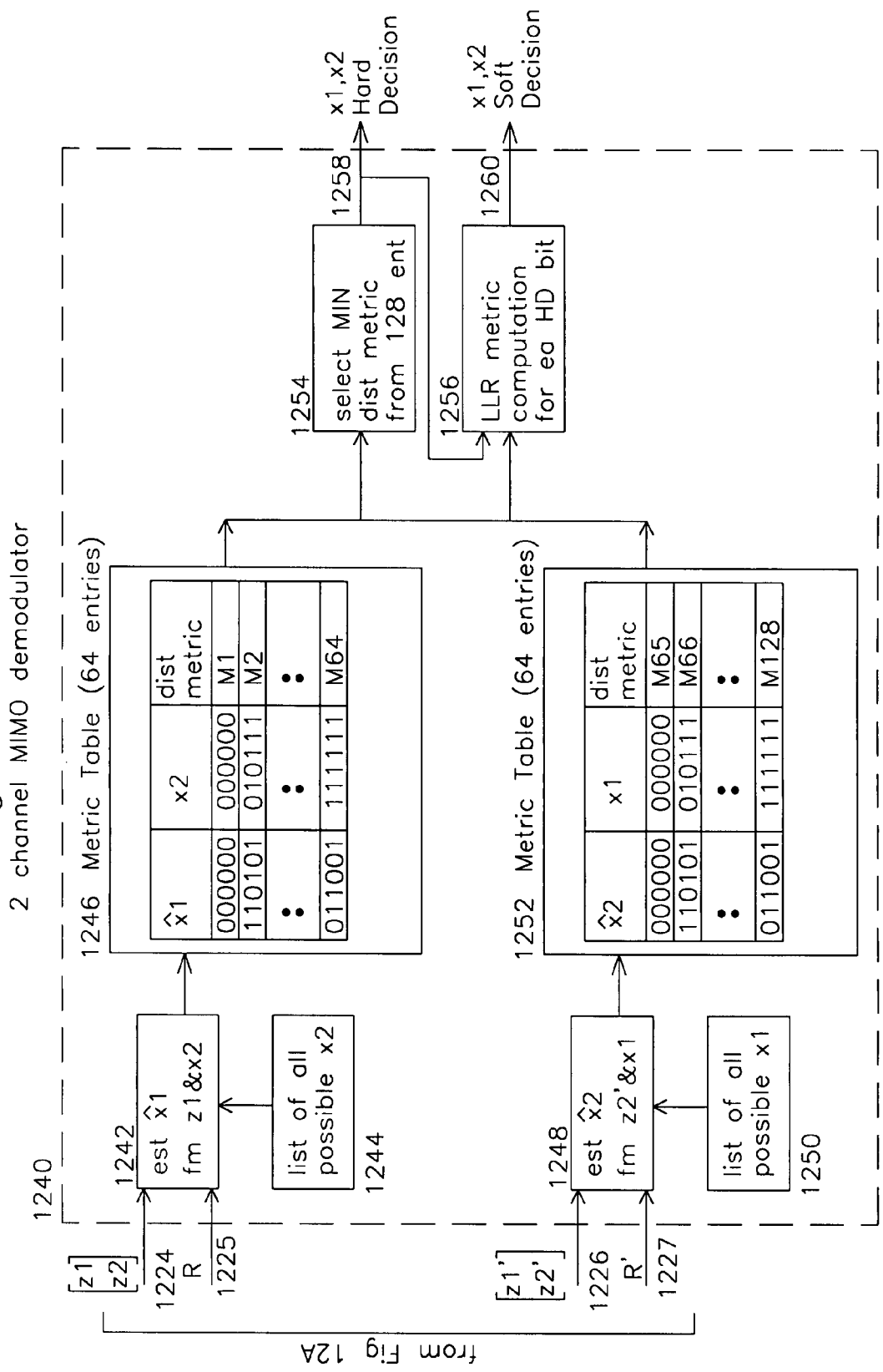
FIG. 12B shows a 2 channel MIMO decoder operating on the output of FIG. 12A.

FIGS. 12A and 12B show a 64-QAM reduced complexity maximum likelihood decoder which includes a symbol transformation 1202 of FIGS. 12A and 2 channel decoder 1240 of FIG. 12B. FIG. 12A shows the symbol transformation part 1202 which includes a first QR matrix decomposition 1210 which converts the channel characterization H matrix 1204 into an R matrix 1225 and a first hermitian $Q^H$ matrix for multiplication 1220 with input symbols [y1,y2] 1206 to form [z1,z2] 1224. The H channel estimate matrix 1204 is also column swapped 1208 as shown in 1208' to form H', which is input to a second QR matrix decomposition 1214 which may be identical in structure to 1210, and the second QR matrix decomposition 1214 produces R' 1227 and a second hermitian matrix $Q'^H$ which is multiplied 1222 by [y1,y2] 1206 to generate [z1',z2'] 1226. There are many ways to generate the QR matrix decomposition function 1210 and 1214, and these may be the identical functional block 1210 and optionally multiplier 1220 multiplexed across H and H' to form the required variables Z and Z'. As described for the equations of FIG. 5, the Q and R matrices have the property that the product Q*R forms the H matrix 1204, and the R matrix is an upper-triangular matrix which has the property that at least one input variable can be separated in one step as was shown in equation 5.9. The transformed variables Z and Z' are input to the decoder 1240 of FIG. 12B.

FIG. 12B shows z1 from FIG. 12A input to an x1 estimator 1242, which takes each possible combination of x2 1244 from the QAM-64 constellation, and substitutes these possible x2 values along with the z1 input into equation 5.8 to solve for x1. The x1 estimate and associated possible x2 value are put in table 1246 along with a distance metric from the symbol to form first metric table 1246. There are many methods for computing a distance metric for each table entry estimated X (ex1 ... exn), to a possible X (px1 ... pxn). The distance metric computation may be made by summing the distances $(ex1-px1)^2+(ex2-px2)^2 ... (exn-pxn)^2$. Many other distance metric computations including LLR are possible for this calculation, which is known in the art and other calculations may be substituted without limitation in scope of the invention. Second metric table 1252 is similarly populated, but with all possible x1 symbols 1250, which are also used in combination with input z2' to compute estimates of x2. The second metric table then contains x2 estimate, x1, and a distance metric computed as was done for the first table 1246. The minimum distance metric select function 1254 operates over all entries in the first and second table, and generates hard decision x1 and x2. The soft decision 1260 is determined for each of the bits of the hard decision using LLR metric computations as known in the prior art.

Figure 13A:
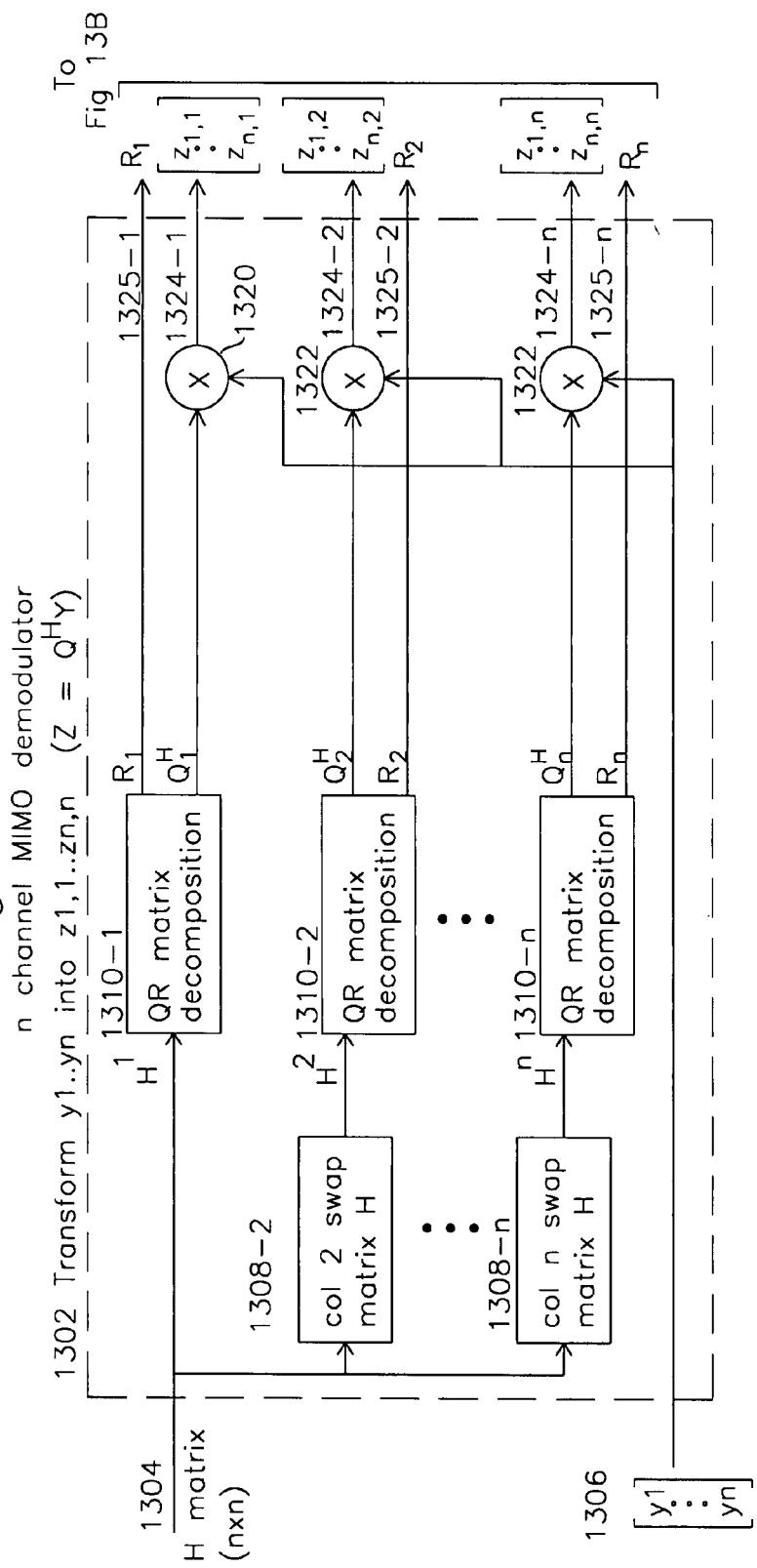
FIGS. 13A and 13B show the block diagrams for a demodulator for N streams and k symbols.

FIG. 13A shows the generalized transformation 1302 of y1 ... yn into z1,1 ..., zn,n for an n-channel MIMO system. A matrix H column swap occurs in each of 1308-2 through 1308-n, followed by a QR matrix decomposition 1310-1 through 1310-n. The column swap for column 1 to column 1 is not shown, as this is a null operation. As shown in 1308-2 column 2 swap and 1308-(n−1) column swap, for each m from 1 through n, a matrix $H_m$ is formed by swapping column 1 with the given column m. This matrix is presented to QR matrix decomposition 1310-1 through 1310-n thereby generating an Rm matrix and an associated Zm matrix for m=1 through n.

Figure 13B:
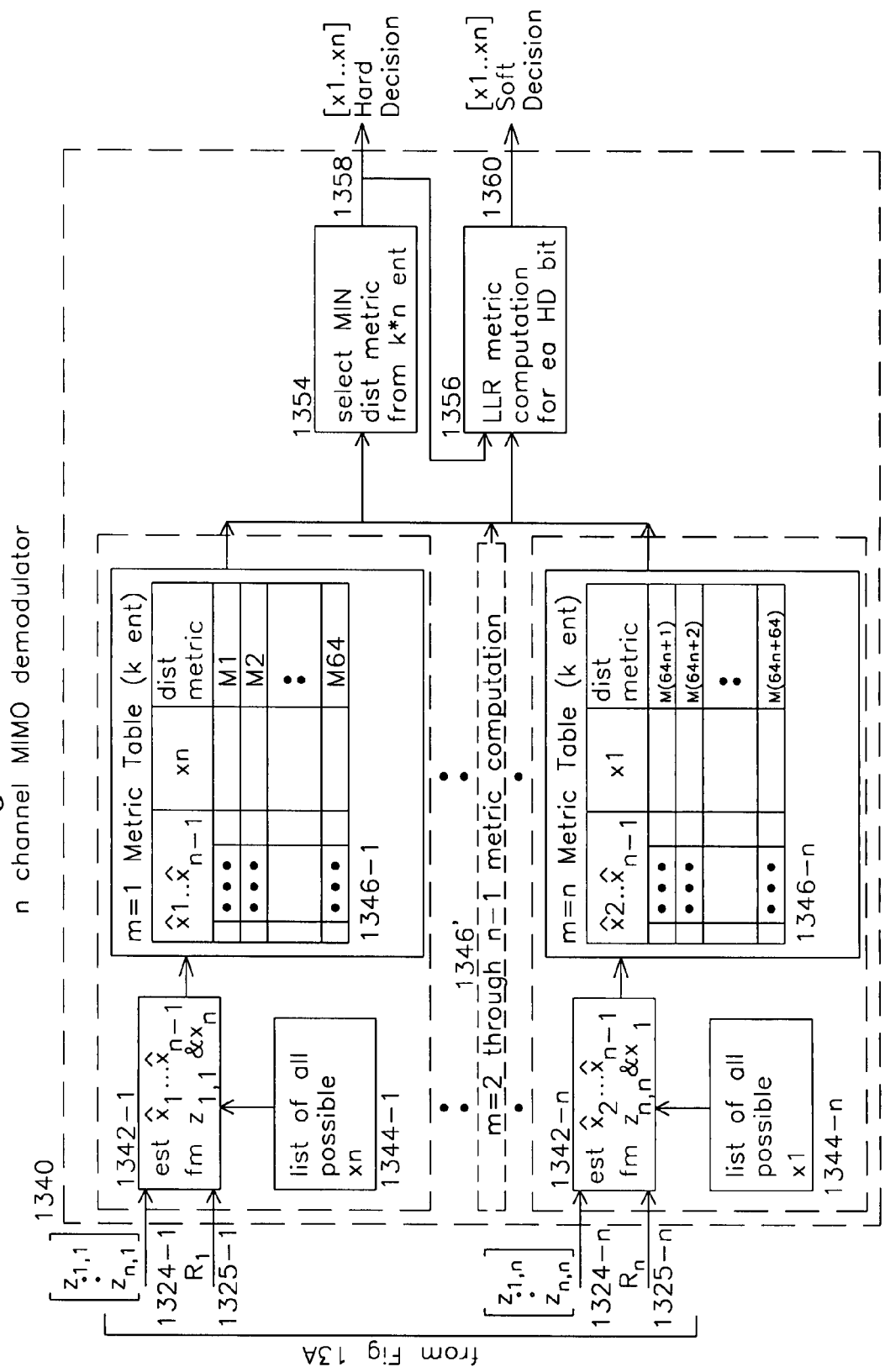

FIG. 13B accepts each Rm and associated Zm matrix, and uses one of the Zm values combined with each of the k possible xm value (for a constellation having k possible values) to generate a mth metric table having k entries, shown in FIG. 13B for k=64 associated with 64-QAM. Each entry of metric table m contains one possible value for xm, along with estimates for all x1 through xn (other than the xm used in the computation), where the estimates of x1 through xn are computed from xm and zm,m using the relationships shown in the generalized form of equation 5.7 for n channels. Associated with each entry is a distance metric which relates to the distance for each combination of estimated x1 ... xn to a possible x1 ... xn, as was described in FIG. 12B. Each metric table 1 through n is constructed in this manner, using an mth value for zm,m combined with all possible k xm to form a table of estimates of x1 ... xn and an associated metric measuring the distance to an actual x1 ... xn set of values. The minimum distance metric selector 1354 then selects the minimum metric and associated x1 ... xn value to form the hard decision 1358. LLR metric computation function 1356 generates a similar soft decision.

While the exemplar metric tables 1246 and 1252 of FIGS. 12B and 1346-1 and 1346-n show k=64 such as for the modulation system of QAM-64, it is understood to one skilled in the art that these tables and related processing are accordingly modified for different modulations, such that k may be any of 2 (such as for BPSK), 4 (such as for QPSK), 16 (such as for 16-QAM), or any other value known in the prior art related to a particular modulation system, whereby the size of the associated table shown as k entries would accordingly change.

FIG. 14 shows the form of equations suitable for use in estimating channels from Z, R and a single value for xm. Equations 14.2 enables the solution of xn given zn and Rnn. This value for xn may then be substituted into equation 14.3 along with zn−1, R(n−1,n) to solve for xn−1, continuing in this manner to estimate all x1 ... xn except the seed value of xm used in the solution.

Figure 15A:
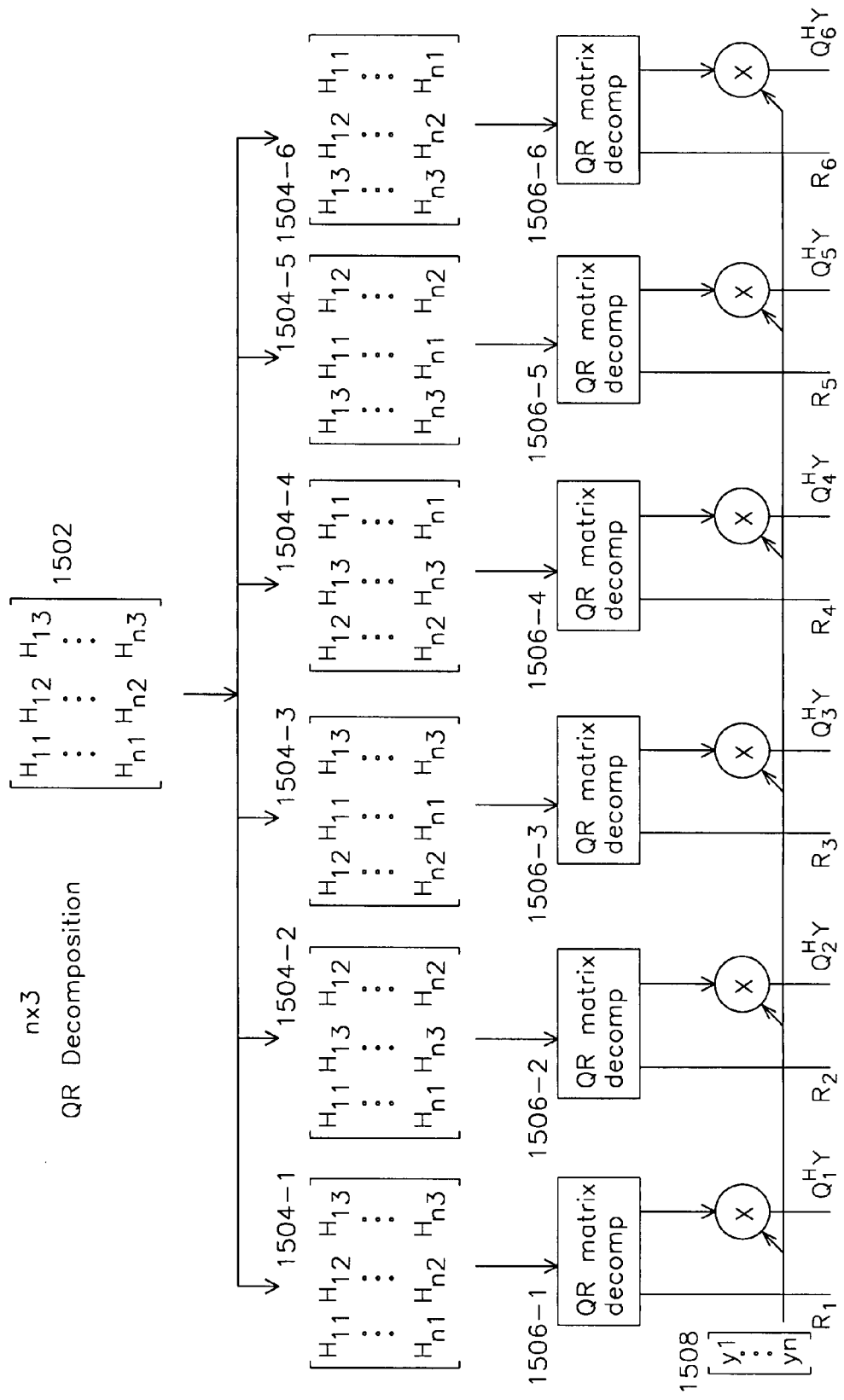
FIGS. 15A, 15B, and 15C show the block diagram for a reduced complexity 3×3 MIMO detector.
Figure 15B:
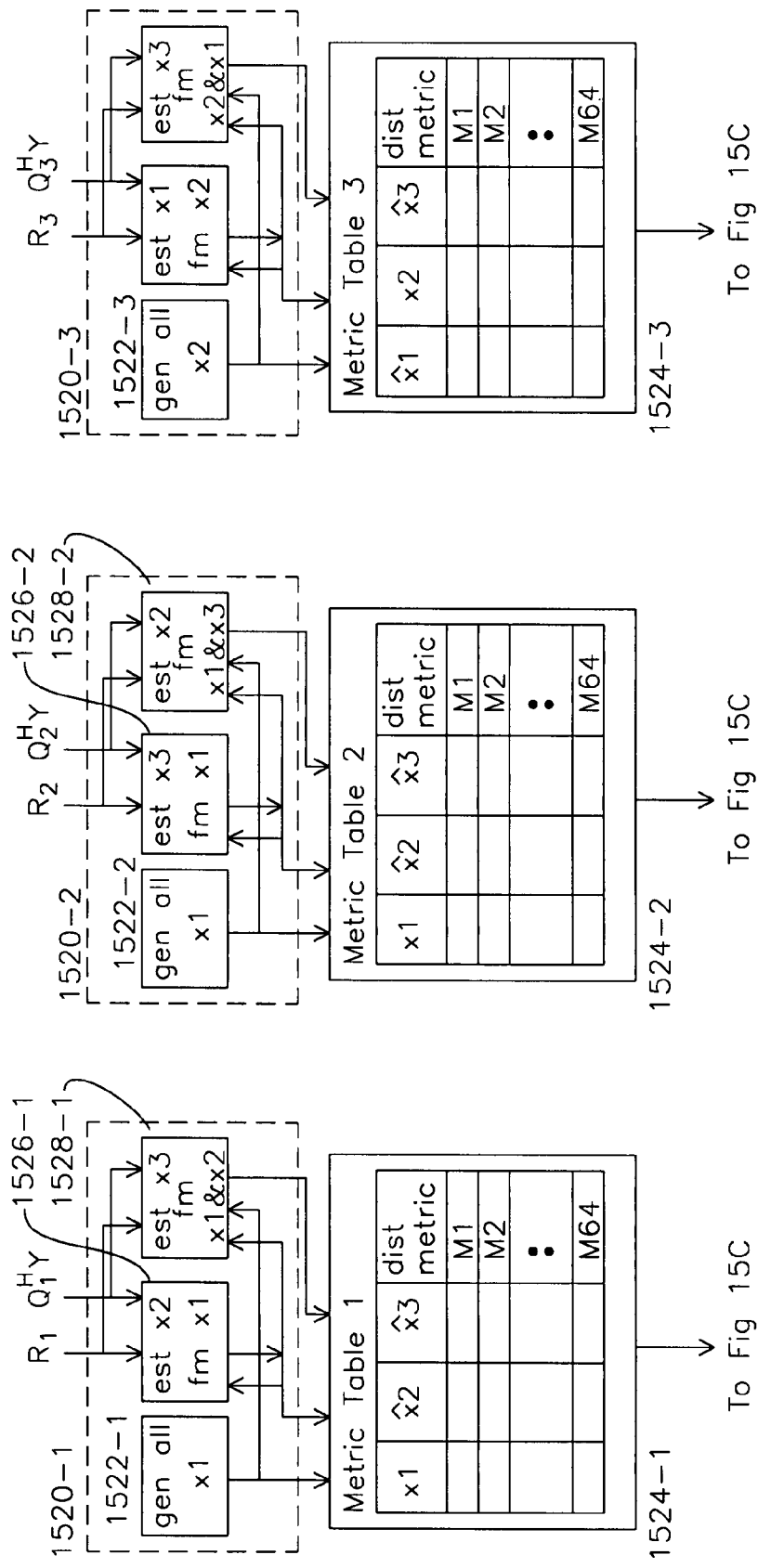
Figure 15C:
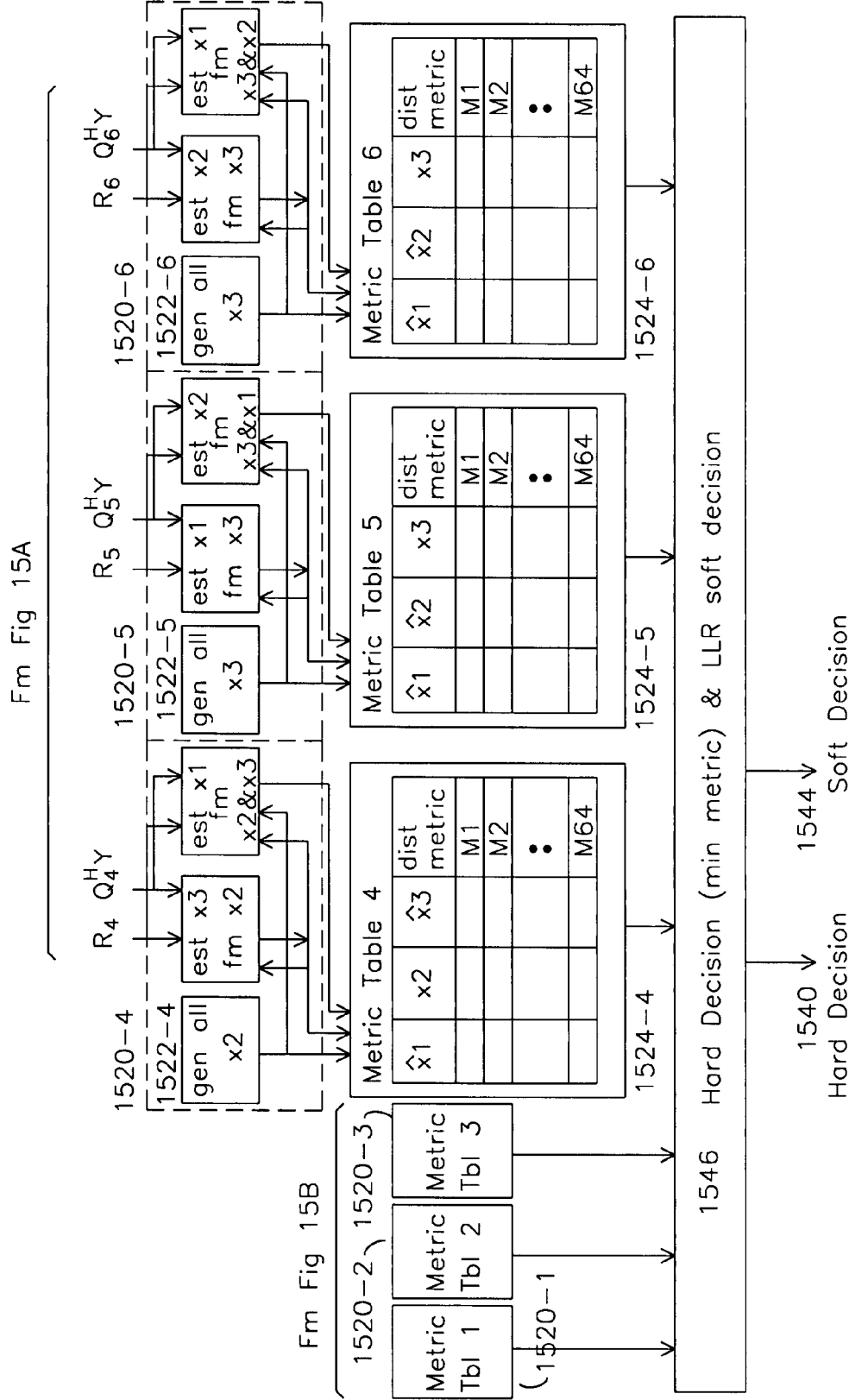

FIGS. 15A, 15B and 15C show another embodiment for a reduced complexity MIMO detector operating on an nx3 MIMO stream Y 1508 accompanied by a channel characterization H matrix 1502. FIG. 15A shows the reordering of the H matrix columns, where for a three column matrix, each of the six possible combinations for column ordering are performed. An initial H matrix 1502 having columns {1,2,3} is reordered to the possible column combinations {1,2,3} 1504-1, {1,3,2} 1504-2, {2,1,3} 1504-3, {2,3,1} 1504-4, {3,1,2} 1504-5, and {3,2,1} 1504-6. Each respective column arranged matrix is then decomposed into R and $Q^H$, by QR decomposition functions 1506-1 through 1506-6, as shown, and each $Q^H$ is multiplied by Y to generate R1 through R6 accompanied by $Q_1^H Y$ through $Q_6^H Y$. These decompositions are delivered to each of the corresponding metric table element computers 1520-1 through 1520-6 of FIGS. 15B and 15C. Each matrix table element computer generates the values for an associated metric table. Examining a first metric table element computer 1520-1, a possible symbol generator 1522-1 generates a first set of all of the k possible symbols. This first set of symbols is provided to first symbol estimator 1526-1, which in combination with the associated R1 and $Q_1^H Y$ matrix generates a first symbol estimate, and for each such symbol estimate, second symbol estimator 1528-1 generates a second symbol estimate. In this manner, table 1524-1 is populated with a first symbol (x1), an associated first symbol estimate (x2) and an associated second symbol estimate (x3). Each symbol estimate is computed in sequence such as was shown for FIG. 14 using the upper triangular matrix property of the R matrix, and as was described for the previous embodiments. As was described for the earlier embodiments, each entry in the metric table 1524-1 comprises a symbol value and associated first and second symbol estimate, and the number of entries in the metric table is equal to the number of symbols k, shown as 64. Each of the 6 metric table element computers 1520-1 through 1520-6 and associated metric tables 1524-1 through 1524-6 shown in FIGS. 15B and 15C operate on each column-ordered upper triangular R matrices to generate an associated table 1524-1 through 1524-6. The overall result of this is the generation of 6 tables, each having k entries, each entry a symbol triple comprising a possible symbol value and two estimated symbol successively computed from the earlier symbols of the triple, and a distance metric representing the distance from the {x1,x2,x3} symbol triple to a possible symbol triple, as was described previously. The decision function 1546 makes a hard decision 1540 based on minimum distance metric and a soft decision 1544 using LLR, or any other method for the generation of soft decisions according to the prior art.

Figure 16A:
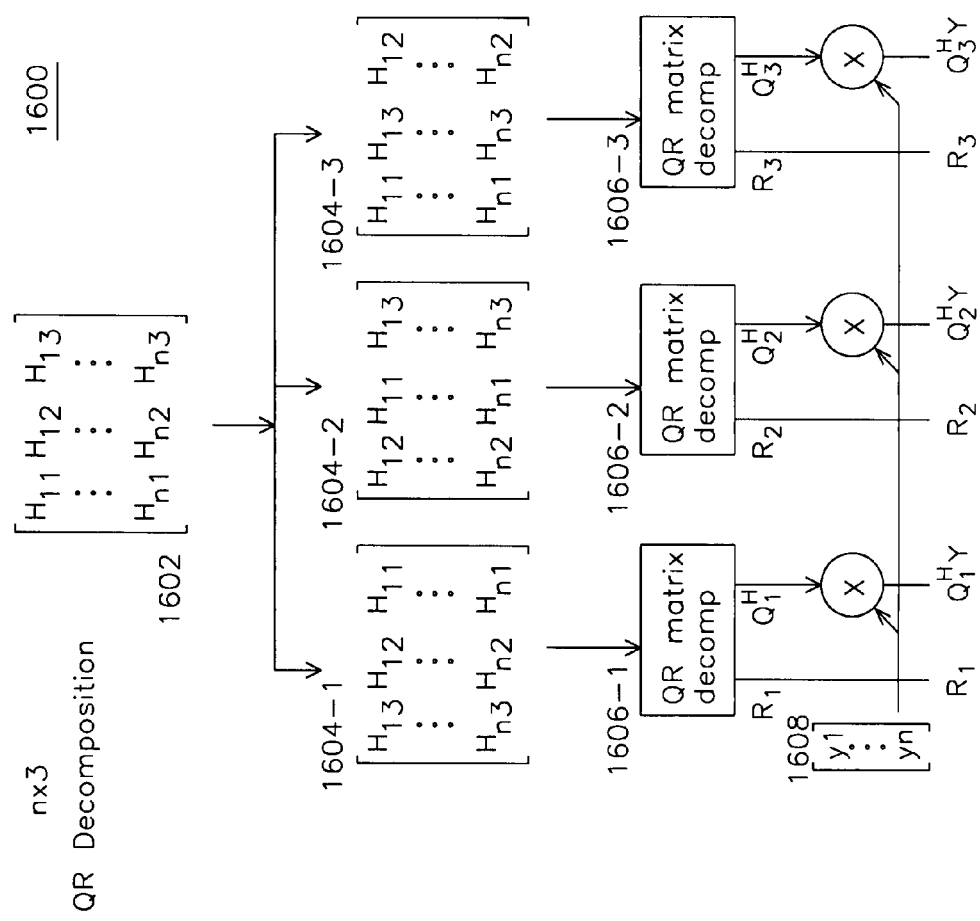
FIGS. 16A and 16B show a block diagram for a reduced complexity 3×3 MIMO detector.
Figure 16B:
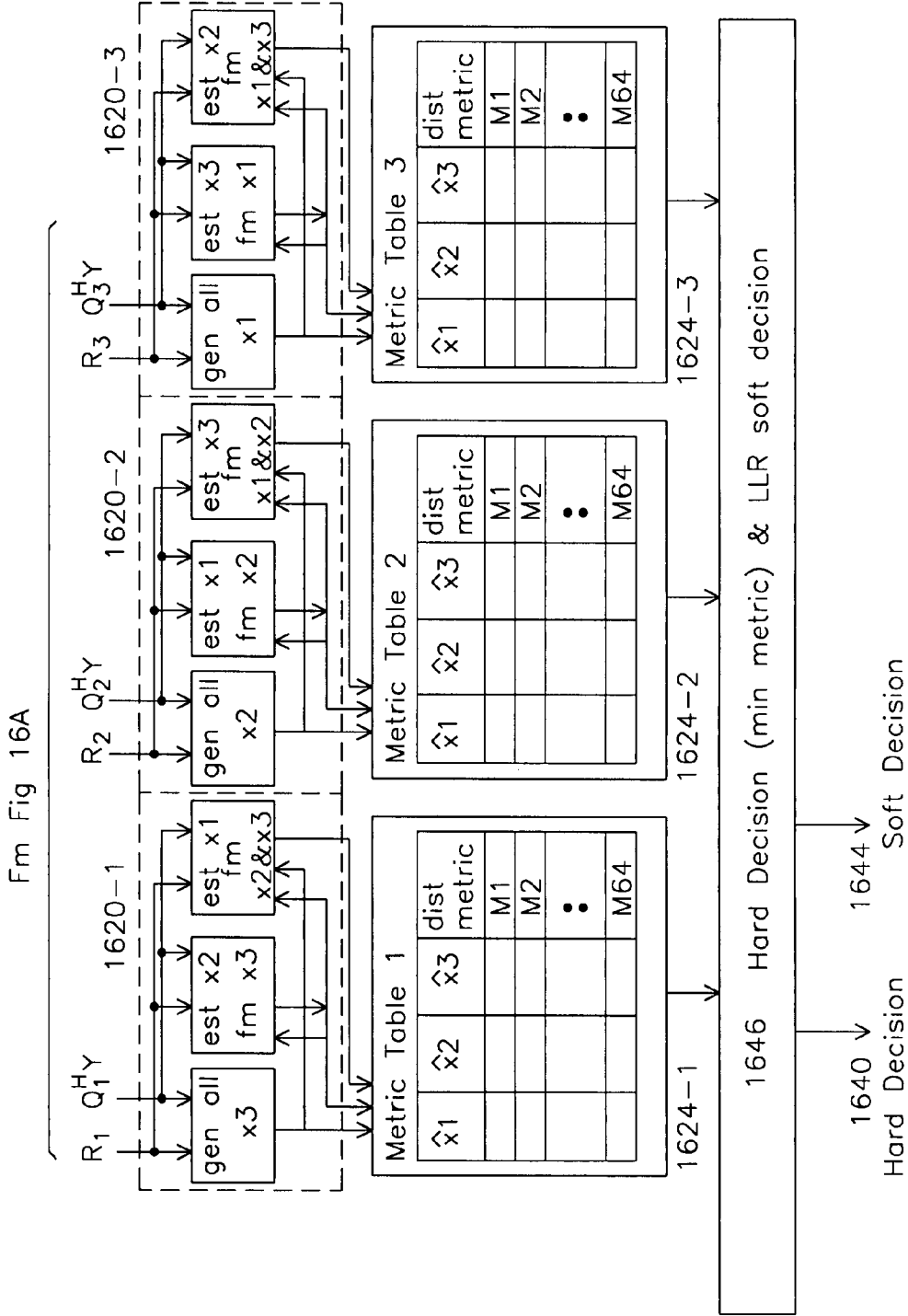

FIGS. 16A and 16B show another embodiment of the invention derived from a reduced complexity version of FIGS. 15A-15C. In FIG. 16A, the H matrix 1602 is column-arranged into the three matrices 1604-1, 1604-2, 1604-3, as shown. Each of these matrices is provided to a QR matrix decomposition 1606-1 through 1606-3, each of which generates an upper triangular matrix R and a Z matrix, where $Z=Q^H Y$, as before. FIG. 16B shows the metric table element computers 1620-1, 1620-2, 1620-3, each of which has a symbol generator to generate the possible values for x3, x2, x1, respectively. Element computer 1620-1, for example, includes a first symbol generator which generates all possible values of x3, after which a first symbol estimator estimates x2 for each such x3, after which a second symbol estimator estimates x1 from the x3 and the previously computed x2. This symbol triples {x1,x2,x3} becomes an entry in metric table 1, and the entry has an associated distance metric which relates to the distance from the symbol triple to a possible actual symbol. In this manner, each of the metric tables 1624-1, 1624-2, 1624-3 are filled, after which decision function 1646 generates a hard decision 1640 and soft decision 1644, as before. While the ordering of the H matrices of FIG. 16A is shown as the particular orderings 1604-1, 1604-2, 1604-3, other matrix orderings are possible, and it is also possible to evaluate the values of a particular H matrix 1602 to determine on-the-fly column orderings to use for the duration of the H matrix, which may have a duration approximately equal to an individual packet duration. It is understood that the reduced complexity three H matrix decoder of 16A-16B is shown for clarity in understanding this particular embodiment of the invention, rather than limit the scope of the invention. The reduced complexity decoder of FIGS. 16A-16B may provide reduced decoding accuracy compared to the six H matrix decoder of FIGS. 15A-15C, however a dynamic selection of column reordering as opposed to the particular fixed orderings of 1604-1, 1604-2, 1604-3 may produce improved accuracy while preserving the reduced complexity of FIG. 16A. Typically, in an embodiment of FIG. 16A performing dynamic H matrix column arrangement to generate the inputs to the QR decomposition functions 1606-1 through 1606-3, the columns of the H matrix associated with the strongest channels (or highest values) will be ordered from strongest to weakest from the last column to the first column, with the permutations selected giving these columns priority in the order of decoding shown in 1620-1 through 1620-3.

FIGS. 17A and 17B show another embodiment of the invention, whereby the invention may be practiced using an MRC (maximum ratio combining) detector, rather than the QR matrix decomposition and metric tables of FIGS. 15 through 16. FIG. 17A shows the equations of operation for the MRC detector. Equations 1 and 4 represent the incoming received symbols y1,y2, which are represented as linear combinations of the transmitted symbols x1,x2 multiplied by the H matrix, as was described in equation 5.1 of FIG. 5. Equations 1 and 4 are rearranged into equations 2 and 5, forming the values yc1 and yc2, respectively, and these yc1,yc2 values are computed for all possible values of one of $\{x1,x2\}$ to be estimated, and shown as x2. The intermediate values yc1 and yc2 are computed for all possible x2 (or x1), and these are multiplied by the conjugate of the H matrix and an MRC operation is performed over all computed value pairs to determine the most likely x1 and x2 estimates. This is shown in FIG. 17B, where the H matrix 1702 and received symbols 1704 are applied to first intermediate computer 1708 and a second intermediate computer 1710, which form the set of values yc1 and yc2, respectively. These sets of values are then multiplied 1714, 1716 by the conjugate 1712 of the H matrix 1702, thereby generating a set of estimates of x1 and x2. Maximum ratio combining (MRC) detector 1718 operates over this set of values and forms a hard decision 1720 and soft decision 1722, as has been practiced in the prior art of MRC detectors.

Figure 17C:
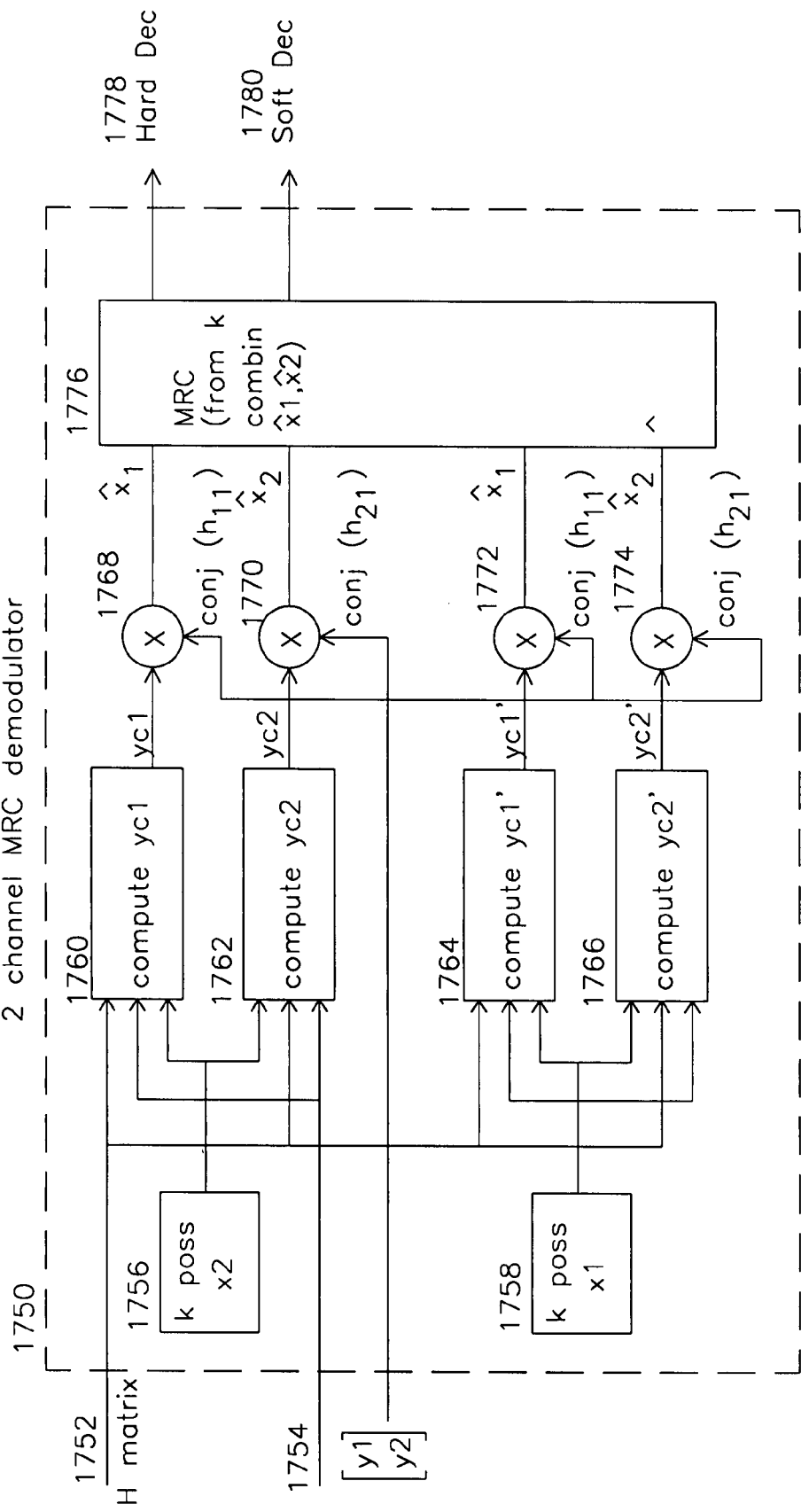

FIG. 17C shows an expanded embodiment of FIG. 17B, where yc1 computation 1760 and yc2 computation 1762 form first estimates x1 and x2 derived from all possible x2 symbols 1756 as before, with an additional yc1' computation 1764 and yc2' computation 1766' which generate second estimates of x1 and x2 from all possible x1 symbols 1758. The MRC 1776 selects from among the first x1,x2 estimates and second x1,x2 estimates, to form hard decision 1778 and soft decision 1780 for each x1,x2 pair.

We claim:

1. A method for a demodulator, the method for generating and selecting a minimum distance metric for a plurality of n streams of incoming symbol data, where n is an integer and said n streams of symbol data are associated with a channel characterization H matrix having n columns, the method comprising:
a stream ordering transformation generating step where for each symbol $y_m$ of an $m^{th}$ one of said n streams of incoming data, and where said m is in the range m=1 to m=n:
said channel characterization H matrix is transformed into an $m^{th}$ stream-specific column-swapped $H_m'$ matrix by swapping the $m^{th}$ column elements with the first column elements of said H matrix, said $m^{th}$ stream-specific column-swapped $H_m'$ matrix thereafter being transformed into a stream-specific $Q_m'$ matrix and a stream-specific upper triangular $R_m'$ matrix, the stream-specific $Q_m'$ matrix and stream-specific upper triangular $R_m'$ matrix having the property that said $Q_m'$ matrix multiplied by said upper triangular $R_m'$ matrix equals said stream-specific $H_m'$ matrix, and said upper triangular $R_m'$ matrix has all elements below a main diagonal with a value of zero, said transformation also computing for each said $Q_m'$ matrix a Hermitian matrix $Q_m'^H$;
forming a table of entries for said $y_m$ having:
a $z_m$ symbol formed by multiplying said $y_m$ symbol by the corresponding said $Q_m'^H$ matrix for that particular stream accompanied by all possible values of $x_m$ for the other streams and computing a distance metric to a received symbol for each said entry;
a $z_m'$ symbol formed by multiplying said $y_m$ symbol by the corresponding said $Q_m'^H$ matrix for that particular stream accompanied by all possible values of $x_m$ for the other streams and computing a distance metric to a received symbol for each said entry;
a minimum metric selecting step of selecting an entry with a minimum distance metric from said table of entries as a most likely candidate.

2. A decision decoder for symbols substantially concurrently received on n streams of incoming data, where n is an integer, the received symbols $[y_1 \ldots y_n]$ forming a symbol matrix Y and accompanied by a channel characterization matrix H having n columns, where for said symbols $[y_1 \ldots y_n]$, the decision decoder demodulates estimates of a symbol matrix X having symbols $[x_1 \ldots x_n]$ from said received symbols $[y_1 \ldots y_n]$, each said demodulated symbol $x_1, x_2 \ldots x_n$ has one of k possible values, where said received symbols $[y_1 \ldots y_n]$ equals said characterization matrix H multiplied by said X plus a discarded noise term, the decision decoder comprising a stream transformation generator and a decision generator:
said stream transformation generator, for each stream m of received symbols, where said stream m is a unique one of said streams 1 through n:
forming a transformed $H_m$ characterization matrix by column swapping the elements of at least one of said H matrix columns with the elements of column m of said H matrix, thereafter forming a $Q_m$ matrix and an upper triangular $R_m$ matrix having elements with value 0 below a main diagonal of said $R_m$ matrix, said $Q_m$ matrix and said $R_m$ matrix formed such that said $Q_m$ matrix multiplied by said $R_m$ matrix equals said $H_m$ matrix;
thereafter forming a $[z_{1,m} \ldots z_{n,m}]$ symbol stream by multiplying the Hermitian of said $Q_m$ matrix with said $[y_1 \ldots y_n]$;

for each said stream m, forming a table m having k entries, each said entry having:
  said $z_{m,n}$ value;
  estimates of all possible symbols $x_1, x_2, \ldots, x_n$;
  a distance metric indicating the distance from the received said $[y_1 \ldots y_n]$ to said table entry;
said decision generator forming a hard decision for $[x_1 \ldots x_n]$ by selecting the table entry having the minimum said distance metric;
said decision generator also forming a soft decision from said distance metric.

3. The decision decoder of claim 2 where said k=64 and said symbols are 64-QAM.

4. The decision decoder of claim 2 where said k=16 and said symbols are 16-QAM.

5. The decision decoder of claim 2 where said n=2.

6. The decision decoder of claim 2 where said n=3.

7. The decision decoder of claim 2 where said $y_1$ through said $y_n$ symbols are Quadrature Amplitude Modulated (QAM) symbols.

8. The decision decoder of claim 2 where said transformed $H_m$ characterization matrix column swap operates on column 1 and said column m.

9. The decision decoder of claim 2 where said channel characterization matrix H is initially column ordered according to channel signal strength.

10. A demodulator for demodulating estimates of matrix X comprising $[x_1 \; x_2]$ from two streams of concurrently received matrix Y symbols comprising $[y_1 \; y_2]$ accompanied by a channel characterization matrix H, where said matrix Y equals said matrix H multiplied by said matrix X plus a discarded noise term, the demodulator having a stream ordering transformation generator and a minimum metric selector:
  said stream ordering transformation generator, for each said stream of received symbols:
    forming a Q matrix and an upper triangular R matrix having elements below a main diagonal with the value zero such that said Q matrix multiplied by said upper triangular R matrix equals said H matrix;
    forming a transformed matrix H' from said matrix H by column swapping the elements of the columns of said matrix H to form said H' matrix, thereafter forming a Q' matrix and an upper triangular R' matrix having elements below a main diagonal with the value zero such that said Q' matrix multiplied by said upper triangular R' matrix generates said H' matrix, thereafter forming a $z_1$ symbol by multiplying the Hermitian of said Q matrix with said $[y_1 \; y_2]$ and forming a $z_2$ symbol by multiplying the Hermitian of said Q' matrix with said $[y_1 \; y_2]$;
  a table generator for each of said two symbol streams, said table generator forming:
    a first table having a plurality of table entries having said $z_1$ symbol and a list of all possible $x_2$ symbols, each said entry including a distance metric indicating the distance from a received symbol;
    a second table having a plurality of table entries having said $z_2$ symbol and a list of all possible $x_1$ symbols, each said entry including a distance metric indicating the distance from said entry to a received symbol;
  said minimum metric selector forming a hard decision by selecting from among the first and second tables, the table entry having the minimum said distance metric;
said minimum metric selector also forming a soft decision from said distance metric.

11. The demodulator of claim 10 where said distance metric is a Log Likelihood Ratio (LLR).

12. The demodulator of claim 10 where the number of possible symbols for each element of said matrix X is 64 and said symbols are 64-QAM.

13. The demodulator of claim 10 where the number of possible symbols for each element of said matrix X is 16 and said symbols are 16-QAM.

14. The demodulator of claim 10 where the number of possible symbols for each element of said matrix X is 2 and said symbols are BPSK.

15. The demodulator of claim 10 where the number of possible symbols for each element of said matrix X is 4 and said symbols are QPSK.

16. The demodulator of claim 10 where said symbols are Quadrature Amplitude Modulated (QAM) symbols.

17. The demodulator of claim 10 where said H matrix column swap operates on columns 1 and 2.

18. A demodulator for three streams of transformed symbols derived from received Y matrix symbols comprising $(y_1, y_2, y_3)$ and a characterization matrix H, the demodulator having:
  a first transformed data stream generator forming a first transformed data stream computed from said Y matrix symbols, a first upper triangular R matrix computed from said H matrix and said first upper triangular R matrix having elements with value of zero below a main diagonal, and the Hermitian of a first Q matrix computed from the said H matrix, said first Q matrix and said first upper triangular R matrix formed such that the product of said first Q matrix and said first upper triangular R matrix is said H matrix, said first transformed data stream generated by multiplying said Y matrix symbols $(y_1, y_2, y_3)$ by the Hermitian of said first Q matrix;
  a second transformed data stream generator forming a second transformed data stream computed from said Y matrix symbols by multiplying said Y matrix symbols with the Hermitian of a second Q matrix, where a second upper triangular R matrix is computed from a transformed $H_2$ matrix derived from said H matrix by swapping the column elements of a first column with the column elements of a different column of said H matrix, said second upper triangular R matrix having elements with value of zero below a main diagonal, and the Hermitian of said second Q matrix computed from said $H_2$ matrix, said second Q matrix and said second upper triangular R matrix formed such that the product of said second Q matrix and said second upper triangular R matrix is said $H_2$ matrix, said second transformed data stream;
  a third transformed data stream generator forming a third transformed data stream computed from said Y matrix symbols by multiplying said Y matrix symbols with the Hermitian of a third Q matrix, where a third upper triangular R matrix is computed from a transformed $H_3$ matrix derived from said H matrix by swapping the column elements of a first column with the column elements of a previously unswapped column of said H matrix, said third upper triangular R matrix having elements with value of zero below a main diagonal, and the Hermitian of said third Q matrix computed from said $H_3$ matrix, said third Q matrix and said third upper triangular R matrix formed such that the product of said third Q matrix and said third upper triangular R matrix is said $H_3$ matrix, said third transformed data stream;

a first table generator accepting said first transformed data stream and generating a first plurality k of metric table entries, each said entry having:
a unique one of said k possible $x_1$ symbol values;
an estimated $x_2,x_3$ value computed from said possible $x_1$ symbol value and said first transformed data stream;
a distance metric representing a distance from said possible $x_1$ symbol and estimated $x_2, x_3$ symbols to said Y matrix symbols $\{y_1, y_2, y_3\}$;
a second table generator accepting said second transformed data stream and generating a second plurality said k of metric table entries, each said entry having:
a unique one of said k possible $x_2$ symbol values;
an estimated $x_1,x_3$ value computed from said possible $x_2$ symbol value and said second transformed data stream;
a distance metric representing a distance from said possible $x_2$ symbol and estimated $x_1, x_3$ symbols to said Y matrix symbols $\{y_1, y_2, y_3\}$;
a third table generator accepting said third transformed data stream and generating a third plurality said k of metric table entries, each said entry having:
a unique one of said k possible $x_3$ symbol values;
an estimated $x_1,x_2$ symbol value computed from said possible $x_3$ value and said third transformed data stream;
a distance metric representing a distance from said possible $x_3$ symbol and estimated $x_2, x_3$ symbols to said Y matrix symbols $\{y_1, y_2, y_3\}$;
a hard decision generator forming a hard decision from selecting said first, said second, or said third metric table entry having a minimum said distance metric, and forming said hard decision from an associated said $x_1,x_2,x_3$ symbol value;
a soft decision generator forming a soft decision from said hard decision and said first, said second, and said third table distance metrics.

19. The demodulator of claim 18 where said soft decision is made from a log likelihood ratio (LLR).

20. The demodulator of claim 18 where said number of possible symbol values k is 64 and said symbols are 64-QAM.

21. The demodulator of claim 18 where said number of possible symbol values k is 16 and said symbols are 16-QAM.

22. The demodulator of claim 18 where said number of possible symbol values k is 4 and said symbols are QPSK.

23. The demodulator of claim 18 where said number of possible symbol values k is 2 and said symbols are BPSK.

24. The demodulator of claim 18 where at least one of said y1,y2,y3 symbols is a Quadrature Amplitude Modulated (QAM) symbol.

25. A symbol decoder for a multiple input multiple output (MIMO) receiver, the receiver accepting a Y matrix input comprising concurrently received symbols accompanied by an H matrix, and thereafter decoding estimates of {x1,x2,x3}, each said x1, x2, and x3 symbol having one of k possible values, the decoder having:
a plurality m of processing paths, each said processing path having:
a matrix column arrangement generator for ordering the columns of said H to produce a column ordered H matrix;
a QR matrix decomposition generator for accepting each said column ordered H matrix and generating a an upper triangular R matrix having values of zero below a major diagonal and a Q matrix such that the product of said Q matrix and said upper triangular R matrix is said column ordered H matrix;
a multiplication generator for multiplying said Y matrix by the Hermitian of said Q matrix, thereby forming a multiplication output;
a metric table generator accepting said upper triangular R matrix and said multiplication output, and forming a plurality of entries placed into a metric table, each said entry having:
a possible symbol having one of said k possible values,
a first symbol estimate derived from said possible symbol and said R matrix and said multiplication output,
a second symbol estimate derived from said possible symbol and said R matrix and said multiplication output,
a metric distance representing the distance from said possible symbol, said first symbol estimate, and said second symbol estimate to a possible symbol;
a decision generator for examining the entries of said m metric tables and decoding a hard decision value and a soft decision value from among said entries.

26. The decoder of claim 25 where said matrix column arrangement generator for said H matrix changes columns {1,2,3} to {1,2,3}, {1,3,2}, {2,1,3}, {2,3,1}, {3,1,2}, and {3,2,1}.

27. The decoder of claim 25 where said matrix column arrangement generator for said H matrix changes columns (1,2,3) to {3,2,1}, {2,1,3}, {1,3,2}.

28. The decoder of claim 25 where said column arrangement generator is responsive to the values of said H matrix.

29. The decoder of claim 25 where said number of possible symbol values is 64 and said symbols are Quadrature amplitude modulated (QAM).

* * * * *